US012424942B2

(12) United States Patent
Li et al.

(10) Patent No.: US 12,424,942 B2
(45) Date of Patent: Sep. 23, 2025

(54) VOLTAGE CONVERTER AND A POWER SUPPLY CONTROL CIRCUIT THEREOF

(71) Applicant: Chengdu Monolithic Power Systems Co., Ltd., Chengdu (CN)

(72) Inventors: Hui Li, Hangzhou (CN); Siran Wang, Hangzhou (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 357 days.

(21) Appl. No.: 18/076,608

(22) Filed: Dec. 7, 2022

(65) Prior Publication Data

US 2023/0238889 A1  Jul. 27, 2023

(30) Foreign Application Priority Data

Jan. 24, 2022 (CN) .......................... 202210081397.6

(51) Int. Cl.
*H02M 1/36* (2007.01)
*H02M 1/08* (2006.01)
*H02M 3/335* (2006.01)

(52) U.S. Cl.
CPC ......... *H02M 3/33507* (2013.01); *H02M 1/08* (2013.01); *H02M 1/36* (2013.01)

(58) Field of Classification Search
CPC ......... H02M 3/33507; H02M 3/33523; H02M 3/135; H02M 1/08; H02M 1/36; H02M 1/007; H02M 1/0006; H02M 1/12; H02M 1/14; H02M 1/32; H02M 7/06; H02J 7/00
See application file for complete search history.

(56) References Cited

U.S. PATENT DOCUMENTS

| | | | |
|---|---|---|---|
| 9,742,262 B1* | 8/2017 | Jutras | H02M 1/36 |
| 9,787,194 B2 | 10/2017 | Li | |
| 10,924,023 B2 | 2/2021 | Chen et al. | |
| 2004/0042239 A1* | 3/2004 | Kitano | H02M 3/33523 |
| | | | 363/49 |
| 2016/0344294 A1* | 11/2016 | Zhang | H02M 1/36 |
| 2019/0013737 A1* | 1/2019 | Lin | H02M 3/33523 |
| 2020/0014304 A1* | 1/2020 | Chang | H02M 3/33523 |
| 2020/0303941 A1* | 9/2020 | Inoue | H02M 1/36 |

* cited by examiner

*Primary Examiner* — Monica Lewis
*Assistant Examiner* — Jye-June Lee
(74) *Attorney, Agent, or Firm* — Perkins Coie LLP

(57) ABSTRACT

A power supply control circuit for controlling a charging process of a power supply capacitor to produce a power supply voltage to power a power control chip is disclosed. The power supply control circuit has a charging switch controlled by a charging control signal, and the power supply capacitor is coupled to an input voltage when the charging switch is on. The power supply control circuit further has a charging control circuit, configured to provide the charging control signal to control the charging switch based on the input voltage, the power supply voltage and a voltage threshold. Thus a high turns ratio of an auxiliary winding to a secondary winding is not necessary, high voltage devices are not needed and the power dissipation caused by the high voltage is also reduced.

20 Claims, 3 Drawing Sheets

VOLTAGE CONVERTER AND A POWER SUPPLY CONTROL CIRCUIT THEREOF

REFERENCE TO RELATED APPLICATIONS

This application claims priority to and the benefit of Chinese Patent Application No.202210081397.6, filed on Jan. 24, 2022, which is incorporated herein by reference in its entirety.

TECHNICAL FIELD

The present invention relates generally to power supplies, and more particularly but not exclusively to power supply control circuits.

BACKGROUND OF INVENTION

With the increase of the smartphone's functions, fast charging technology is needed to meet the large power consumption requirements. FIG. 1 schematically shows a prior art voltage converter 10 in a fast charging power supply. As shown in FIG. 1, an AC voltage Vac is rectified to an input voltage Vin by a bridge rectifier 101 and is provided to a transformer T1. Then the input voltage Vin is converted to an output voltage Vout by the transformer T1 controlled by a primary side switch M1 which is turned on and off by a power control chip 102. The power control chip 102 is powered by an auxiliary winding Lt. The auxiliary winding Lt provides a power supply voltage Vcc proportional to the output voltage Vout, wherein the proportional coefficient is determined by a turns ratio of the auxiliary winding Lt to a secondary winding Ls, i.e., Vcc:Vout=N(Lt):N(Ls), wherein N(Lt) represents turns of the auxiliary winding Lt and N(Ls) represents turns of the secondary winding Ls. It should be understood that, to keep the power control chip 102 working, the power supply voltage Vcc should be maintained above a lower limit, which is usually 10V. When the output voltage Vout is 3.3V, to meet the lower limit of the power supply voltage Vcc, the turns ratio of the auxiliary winding Lt to the secondary winding Ls is at least 3:1. However, if the turns ratio of the auxiliary winding Lt to the secondary winding Ls is fixed to 3:1, the power supply voltage Vcc is 60V when the output voltage Vout is 20V. In that case, high voltage devices are required in the power control chip 102 and more power loss is produced.

SUMMARY OF THE INVENTION

It is an object of the present invention to provide a power supply control circuit for powering a power control chip of a voltage converter. The power control chip is powered by an input of the voltage converter when an output voltage of the voltage converter is relatively low, and is powered by an auxiliary winding of a transformer when the output voltage is relatively high. With this approach, a high turns ratio of the auxiliary winding to a secondary winding of the transformer is not necessary and a high voltage of the auxiliary winding caused by the high turns ratio is avoided. Therefore, energy loss caused by the high voltage of the auxiliary winding is reduced and high voltage devices for withstanding the high voltage of the auxiliary winding are not needed.

In accomplishing the above and other objects, there has been provided, in accordance with an embodiment of the present invention, a voltage converter for converting an input voltage to an output voltage. The voltage converter comprises a power control chip, a power supply capacitor, a charging switch and a charging control circuit. The power supply capacitor has a charging terminal configured to provide a power supply voltage to power the power control chip. The charging switch is coupled between the input voltage and the charging terminal of the power supply capacitor, wherein the charging switch has a control terminal configured to receive a charging control signal. The charging control circuit is configured to provide the charging control signal to control the charging switch based on the input voltage, the power supply voltage and a voltage threshold. The power supply capacitor is coupled to the input voltage when the charging switch is on.

In accomplishing the above and other objects, there has been provided, in accordance with an embodiment of the present invention, a power supply control circuit for controlling a charging process of a power supply capacitor to produce a power supply voltage to power a power control chip wherein the power supply capacitor has a charging terminal. The power supply control circuit comprises a charging switch, coupled between an input voltage and the charging terminal of the power supply capacitor, wherein the charging switch has a control terminal configured to receive a charging control signal. The power supply control circuit further comprises a charging control circuit, configured to provide the charging control signal to control the charging switch based on the input voltage, the power supply voltage and a voltage threshold. The power supply capacitor is coupled to the input voltage when the charging switch is on.

In accomplishing the above and other objects, there has been provided, in accordance with an embodiment of the present invention, a control method of a power supply control circuit for controlling a charging process of a power supply capacitor to produce a power supply voltage to power a power control chip. The control method comprises: charging the power supply capacitor based on a comparison result of the input voltage and a compensation signal. The compensation signal is generated based on a difference between a voltage reference and the power supply voltage, and is refreshed every time when the input voltage decreases to a voltage threshold.

In one embodiment, the control method further comprising: charging the power supply capacitor by the auxiliary winding when a voltage of the auxiliary is higher than a maximum voltage of the power supply capacitor reached by being charged by the input voltage.

BRIEF DESCRIPTION OF THE DRAWINGS

The present invention can be further understood with reference to the following detailed description and the appended drawings, wherein like elements are provided with like reference numerals. The drawings are only for illustration purpose. They may only show part of the devices and are not necessarily drawn to scale.

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art would recognize, however, that the invention can be practiced without one or more of the specific details. In other instances, well-known details are not shown or described to avoid obscuring aspects of the invention.

Figure 1:
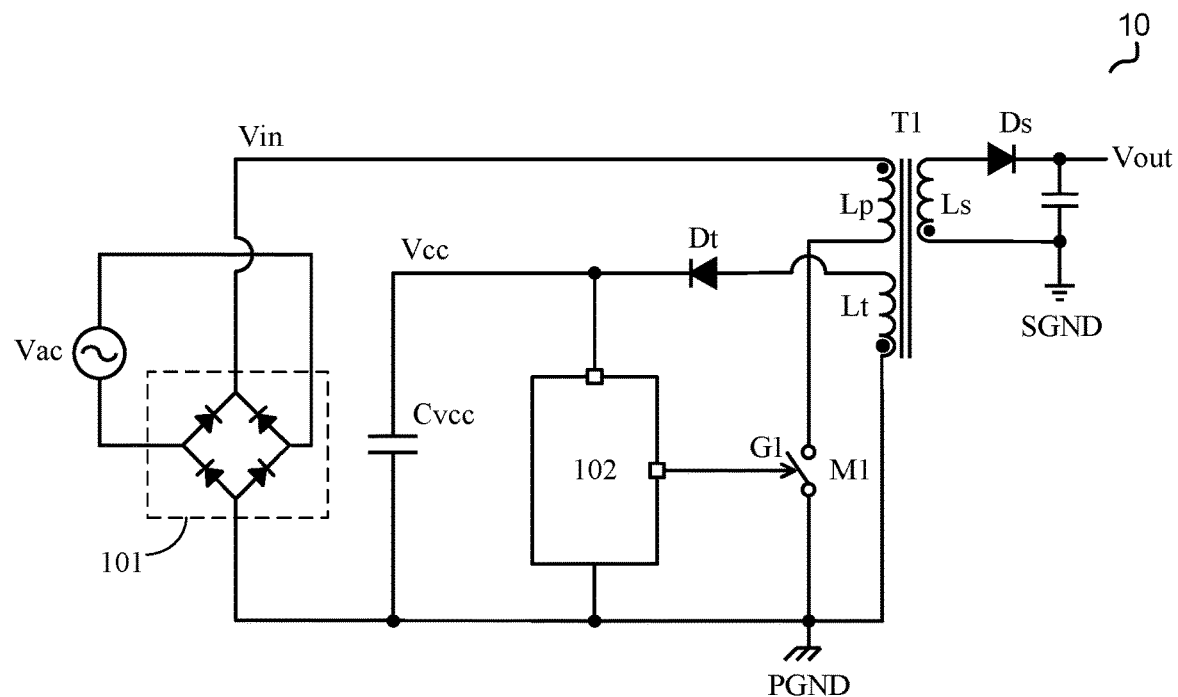
FIG. 1 schematically shows a prior art voltage converter 10 of a fast charging power supply.
Figure 2:
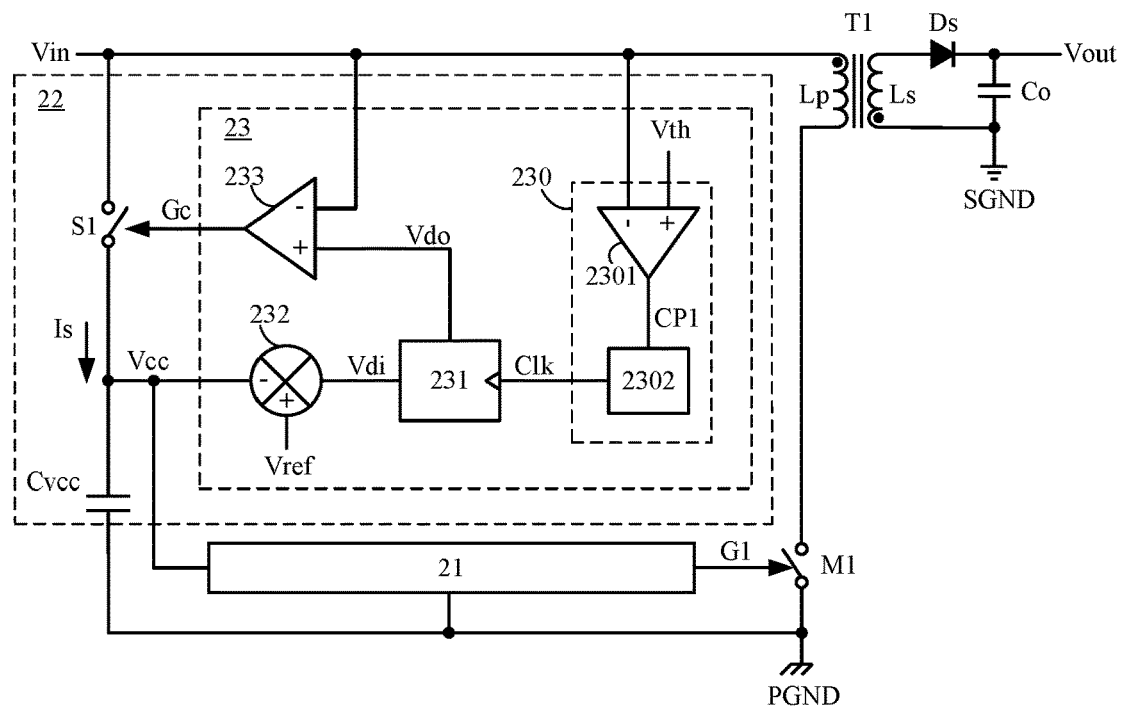
FIG. 2 schematically shows a voltage converter 20 in accordance with an embodiment of the present invention.

FIG. 2 schematically shows a voltage converter 20 in accordance with an embodiment of the present invention. The voltage converter 20 includes a transformer T1, a primary switch M1, a power control chip 21, a power supply capacitor Cvcc and a charging control circuit 23. The transformer T1 comprises a primary winding Lp and a secondary winding Ls. The primary switch M1 is coupled to the primary winding Lp. The power control chip 21 provides a primary control signal G1 to control the primary switch M1. The power supply capacitor Cvcc provides a power supply voltage Vcc to the power control chip 21. The charging control circuit 23 receives an input voltage Vin and the power supply voltage Vcc, and provides a charging control signal Gc based on the power supply voltage Vcc and the input voltage Vin when the input voltage Vin is lower than a voltage threshold Vth, wherein a pulse width of the charging control signal Gc increases as the power supply voltage Vcc decreases. The charging switch S1 is coupled between the input voltage Vin and a charging terminal of the power supply capacitor Cvcc, wherein the charging switch S1 has a control terminal configured to receive the charging control signal Gc, and is controlled by the charging control signal Gc.

In FIG. 2, the charging control circuit 23 includes a first comparison circuit 230, a sample-and-hold circuit 231, a calculating circuit 232, and a second comparison circuit 233. The first comparison circuit 230 is configured to receive the input voltage Vin and the voltage threshold Vth, and to generate a pulse signal Clk based thereon, wherein when the input voltage Vin decreases to the voltage threshold Vth, the pulse signal Clk is valid. The calculating circuit 232 is configured to receive the power supply voltage Vcc and a voltage reference Vref, and to provide a compensation signal Vdi based on a difference between the power supply voltage Vcc and the voltage reference Vref. The sample-and-hold circuit 231 has a clock terminal configured to receive the pulse signal Clk and an input terminal configured to receive the compensation signal Vdi. When the pulse signal Clk is valid, the sample-and-hold circuit 231 samples the compensation signal Vdi and provides a sample-and-hold signal Vdo based on the compensation signal Vdi. The second comparison circuit 233 is configured to receive the sample-and-hold signal Vdo and the input voltage Vin, and to provide the charging control signal Gc based on a comparison result of the sample-and-hold signal Vdo and the input voltage Vin.

In one embodiment, the first comparison circuit 230 comprises: a comparator 2301, configured to receive the input voltage Vin and the voltage threshold Vth, and to provide an input voltage comparison signal CP1 based on the input voltage Vin and the voltage threshold Vth; and a pulse circuit 2302, configured to receive the input voltage comparison signal CP1, and to provide the pulse signal Clk based on the input voltage comparison signal CP1, wherein when the input voltage Vin decreases to the voltage threshold Vth, the pulse signal Clk is valid. It should be understood that, any circuit generating a valid signal for indicating that the input voltage Vin decreases to the voltage threshold Vth may be utilized as the first comparison circuit.

In the embodiment of FIG. 2, the charging control circuit 23 controls a charging process of the power supply capacitor Cvcc through the charging switch S1 to ensure that the power supply capacitor Cvcc provides a suitable power supply voltage Vcc. In other words, the charging control circuit 23, the charging switch S1 and the power supply capacitor Cvcc constitute a power supply control circuit 22. The power control chip 21 is powered by the power supply voltage Vcc from the power supply control circuit 22 to keep the power control chip 21 working. The power control chip 21 generates the primary control signal G1 to control the primary switch M1, thus to control the power conversion between the primary winding and the secondary winding of the transformer T1 to meet a load requirement. Specifically, when the primary switch M1 is turned on and a secondary switch Ds is turned off, then a current flowing through the primary winding Lp increases, and the primary winding Lp stores energy. In that case, the load is powered by an output power supply capacitor Co in FIG. 2. When the primary switch M1 is turned off, the secondary switch Ds is turned on, then the energy stored in the primary winding Lp is transferred to the secondary winding Ls. In that case, the load is powered by the secondary winding Ls, and meanwhile the output capacitor Co is charged to maintain the output voltage Vout.

Figure 3:
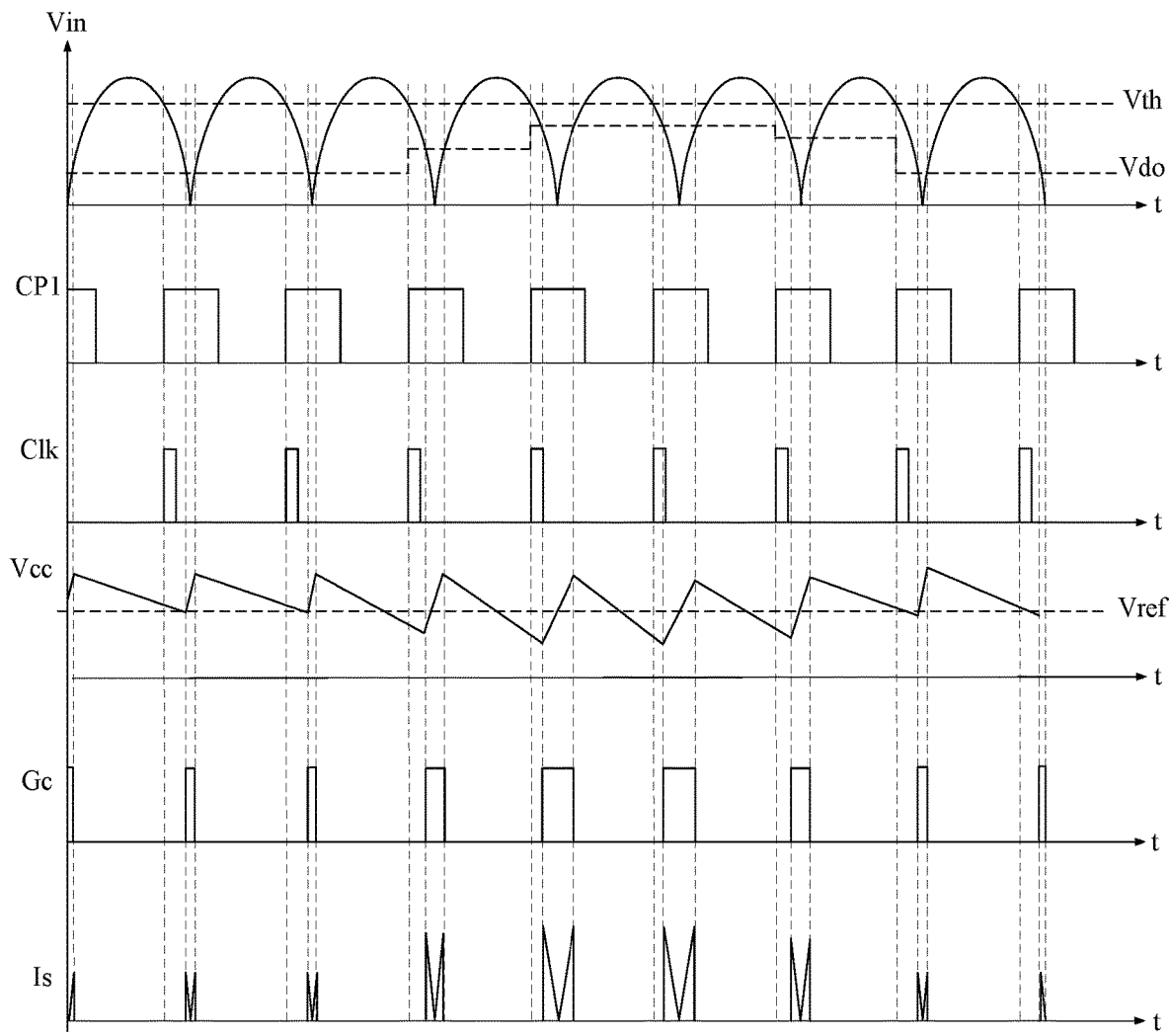
FIG. 3 schematically shows waveforms of signals of a charging control circuit 23 in accordance with an embodiment of the present invention.

FIG. 3 schematically shows waveforms of signals of the charging control circuit 23 in accordance with an embodiment of the present invention. The working principle of the charging control circuit 23 is illustrated below with reference to FIG. 2 and FIG. 3.

As shown in FIG. 3, the input voltage Vin is full-rectified from the AC voltage Vac and has a full-rectified sine waveform. The input voltage Vin is compared with the voltage threshold Vth, and the input voltage comparison signal CP1 is generated based thereon. When the input voltage Vin is lower than the voltage threshold Vth, the input voltage comparison signal CP1 is logic high, otherwise the input voltage comparison signal CP1 is logic low. The pulse circuit 2302 receives the input voltage comparison signal CP1, and sets the pulse signal Clk valid at a rising edge of the input voltage comparison signal CP1. The sample-and-hold circuit 231 samples the compensation signal Vdi when the pulse signal Clk is valid, and then provides the sample-and-hold signal Vdo based thereon. The compensation signal Vdi indicates the difference between the voltage reference Vref and the power supply voltage Vcc, i.e., Vdi=Vref−Vcc. The sample-and-hold circuit 231 holds the sampled value of the compensation signal Vdi, and provides the sample-and-hold signal Vdo. The sample-and-hold signal Vdo is then compared with the input voltage Vin, and the charging control signal Gc is generated based thereon. When the sample-and-hold signal Vdo is larger than the input voltage Vin, the charging control signal Gc is logic high, otherwise, the charging control signal Gc is logic low. When the charging control signal Gc is logic high, the charging switch S1 is turned on, then the charging terminal of the power supply capacitor Cvcc is coupled to the input voltage Vin and the power supply capacitor Cvcc is charged by a charging current Is. As shown in FIG. 3, a waveform of the charging current Is is associated with the input voltage Vin, i.e., Is=(Vin−Vcc)/Rdson, wherein Rdson represents an on-resistance of the charging switch S1.

It should be understood that, the embodiments of FIG. 2 and FIG. 3 are only used to illustrate the working principle in the present invention. In other embodiments, the waveforms of signals and the connection of the circuit may be adaptively changed.

As shown in FIG. 3, a value of the sample-and-hold signal Vdo increases as the power supply voltage Vcc decreases. Accordingly, a time duration of a logic high state of the charging control signal Gc increases, followed by an increase of an on-time of the charging switch S1, which means a charging time of the power supply capacitor Vcc is longer, and the power supply voltage Vcc rises faster. A value of the voltage reference Vref is a target value of the power supply voltage Vcc. When the power supply voltage Vcc increases to the voltage reference Vref, the value of the sample-and-hold signal Vdo becomes zero, which is smaller than the input voltage Vin. Thus the charging control signal Gc becomes logic low, and the charging switch S1 is turned off. As a result, the charging process of the power supply capacitor Cvcc ends. When a value of the power supply voltage Vcc decreases to be lower than the voltage reference Vref, the value of the sample-and-hold signal Vdo becomes larger than zero. The second comparison circuit 233 compares the sample-and-hold signal Vdo with the input voltage Vin, and generates the charging control signal Gc based thereon to control the charging process of the power supply capacitor Cvcc by controlling the charging switch S1.

It should be understood that, the input voltage Vin in the present invention may equal to the actual voltage of the input voltage, or may be partial of the actual voltage of the input voltage. In the embodiment of the FIG. 3, the input voltage Vin has full-rectified sine waveform, i.e., a waveform generated by rectifying a sinusoidal AC voltage by a full bridge rectifier. It should be understood that, the input voltage Vin may have other waveforms, e.g. triangular wave.

The voltage converter 20 has a flyback topology in FIG. 2. It should be understood that, the power supply control circuit 22 comprising the charging control circuit 23, the charging switch S1 and the power supply capacitor Cvcc may be used in a voltage converter with any other topologies, e.g., Buck topology and Boost topology.

Figure 4:
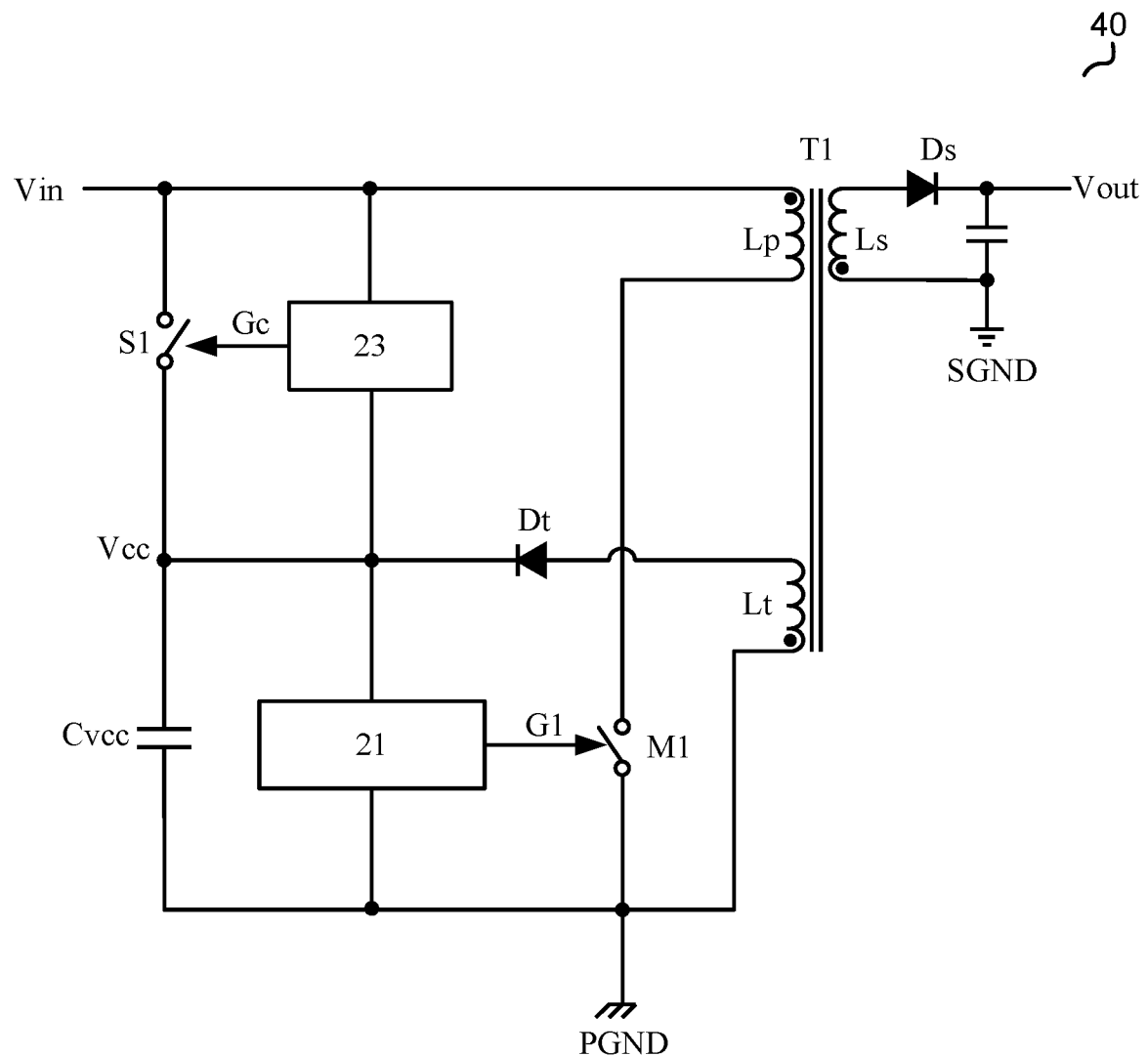
FIG. 4 schematically shows a voltage converter 40 in accordance with an embodiment of the present invention.

FIG. 4 schematically shows a voltage converter 40 in accordance with an embodiment of the present invention. The voltage converter 40 comprises the transformer T1, the primary switch M1, the power control chip 21, the power supply capacitor Cvcc, the charging control circuit 23 and the charging switch S1. The transformer T1 has the primary winding Lp and the secondary winding Ls. The primary switch M1 is coupled to the primary winding Lp. The power control chip 21 is configured to provide the primary control signal G1 to control the primary switch M1. The power supply capacitor Cvcc is configured to provide the power supply voltage Vcc to the power control chip 21. The charging control circuit 23 is configured to receive the input voltage Vin and the power supply voltage Vcc, and to provide the charging control signal Gc based on the input voltage Vin and the power supply voltage Vcc when the input voltage Vin is lower than the voltage threshold Vth. The pulse width of the charging control signal Gc increases as the power supply voltage Vcc decreases. The charging switch S1 is coupled between the input voltage Vin and the power supply capacitor Cvcc, and controlled by the charging control signal Gc.

In FIG. 4, the transformer T1 further comprises the auxiliary winding Lt. The auxiliary winding Lt is coupled to the power supply capacitor Cvcc through a diode Dt. When a voltage provided by the auxiliary winding Lt is higher than a maximum voltage of the power supply capacitor Cvcc reached by being charged by the input voltage Vin, i.e., the voltage reference Vref, the power supply capacitor Cvcc is charged by the auxiliary winding Lt. By properly setting the voltage reference Vref and the turns ratio of the auxiliary winding Lt to the secondary winding Ls, the power supply capacitor Cvcc is charged by the auxiliary winding Lt when the output voltage Vout is relatively high, and is charged by the charging control circuit 23 through controlling the charging switch S1 when the output voltage Vout is relatively low.

As mentioned above, when the output voltage Vout is low, the power supply capacitor Cvcc is charged by the charging control circuit 23 instead of the auxiliary winding Lt, thus a high turns ratio of the auxiliary winding Lt to the secondary winding Ls is not necessary, which means the turns ratio could be 1:1 or 1:2, or even lower. In the case that the turns ratio of the auxiliary winding Lt to the secondary winding Ls is 1:2, even when the output voltage Vout is 20V, a highest of the power supply voltage Vcc is 10V. That is to say, when the turns ratio of the auxiliary winding Lt to the secondary winding Ls is low, even when the output voltage Vout is relatively high, the voltage provided by the auxiliary winding Lt is low, thus the power control chip 21 does not need to withstand a high voltage. As a result, high voltage devices are not required and the power dissipation caused by the high voltage is also reduced.

In one embodiment, the charge control circuit 23 is integrated to the power control chip 21.

In one embodiment, the charge control circuit 23 and the charge switch S1 are both integrated to the power control chip 21.

The charging switch S1 may include any controllable switch such as JFET (Junction Field Effect Transistor), MOSFET (Metal-Oxide-Semiconductor Field Effect Transistor) and the like.

It should be understood, the circuit and the workflow given in the present invention are just for schematic illustration. Any circuit can realize the function and operation of the present invention does not depart from the spirit and the scope of the invention.

While specific embodiments of the present invention have been provided, it is to be understood that these embodiments are for illustration purposes and not limiting. Since the invention can be practiced in various forms without distracting the spirit or the substance of the invention, it should be understood that the above embodiments are not confined to any aforementioned specific detail, but should be explanatory broadly within the spirit and scope limited by the appended claims. Thus, all the variations and modification falling into the scope of the claims and their equivalents should be covered by the appended claims.

What is claimed is:

1. A voltage converter for converting an input voltage to an output voltage, comprising:
   a power control chip;
   a power supply capacitor, having a charging terminal configured to provide a power supply voltage to power the power control chip;
   a charging switch, coupled between the input voltage and the charging terminal of the power supply capacitor, wherein the charging switch has a control terminal configured to receive a charging control signal; and
   a charging control circuit, configured to provide the charging control signal to control the charging switch based on the input voltage and a compensation signal, and the compensation signal is refreshed when the input voltage decreases to a voltage threshold, wherein the power supply capacitor is coupled to the input voltage when the charging switch is on.

2. The voltage converter of claim 1, wherein an on time period of the charging switch increases as the power supply voltage decreases.

3. The voltage converter of claim 1, wherein the charging control circuit comprises:

a first comparison circuit, configured to generate a pulse signal based on the input voltage and the voltage threshold, wherein when the input voltage is lower than the voltage threshold, the pulse signal is valid;

a calculating circuit, configured to provide the compensation signal based on a difference between the power supply voltage and a voltage reference;

a sample-and-hold circuit, configured to sample a value of the compensation signal when the pulse signal is valid and to provide a sample-and-hold signal based on the sampled value of the compensation signal; and a second comparison circuit, configured to provide the charging control signal based on a comparison result of the sample-and-hold signal and the input voltage.

4. The voltage converter of claim 3, wherein the first comparison circuit comprises:

a comparator, configured to provide an input voltage comparison signal based on the input voltage and the voltage threshold; and a pulse circuit, configured to provide the pulse signal based on the input voltage comparison signal, wherein the pulse signal is valid when the input voltage is lower than the voltage threshold.

5. The voltage converter of claim 1, further comprising:

a transformer, having a primary winding, a secondary winding and an auxiliary winding.

6. The voltage converter of claim 5, wherein the charging terminal of the power supply capacitor is coupled to the auxiliary winding of the transformer and the power supply capacitor is charged by the auxiliary winding when a voltage of the auxiliary winding is higher than a maximum voltage of the power supply capacitor reached by being charged by the input voltage.

7. The voltage converter of claim 5 further comprising:

a primary switch, coupled to the primary winding.

8. The voltage converter of claim 1, wherein the charging control circuit is integrated to the power control chip.

9. The voltage converter of claim 1, wherein the charging control circuit and the charging switch are integrated to the power control chip.

10. A power supply control circuit for controlling a charging process of a power supply capacitor to produce a power supply voltage to power a power control chip, wherein the power supply capacitor has a charging terminal, the power supply control circuit comprising:

a charging switch, coupled between an input voltage and the charging terminal of the power supply capacitor, wherein the charging switch has a control terminal configured to receive a charging control signal; and a charging control circuit, configured to provide the charging control signal to control the charging switch based on the input voltage and a compensation signal, and the compensation signal is refreshed when the input voltage decreases to a voltage threshold, wherein the power supply capacitor is coupled to the input voltage when the charging switch is on.

11. The power supply control circuit of claim 10, wherein an on time period of the charging switch increases as the power supply voltage decreases.

12. The power supply control circuit of claim 10, wherein the charging control circuit comprises:

a first comparison circuit, configured to generate a pulse signal based on the input voltage and the voltage threshold, wherein when the input voltage is lower than the voltage threshold, the pulse signal is valid;

a calculating circuit, configured to provide the compensation signal based on a difference between the power supply voltage and a voltage reference;

a sample-and-hold circuit, configured to sample a value of the compensation signal when the pulse signal is valid, and to provide a sample-and-hold signal based on the sampled value of the compensation signal; and a second comparison circuit, configured to provide the charging control signal based on a comparison result of the sample-and-hold signal and the input voltage.

13. The power supply control circuit of claim 12, wherein the first comparison circuit comprises:

a comparator, configured to provide an input voltage comparison signal based on the input voltage and the voltage threshold; and a pulse circuit, configured to provide the pulse signal based on the input voltage comparison signal, wherein the pulse signal is valid when the input voltage is lower than the voltage threshold.

14. The power supply control circuit of claim 10, wherein the charging terminal of the power supply capacitor is coupled to an auxiliary winding.

15. The power supply control circuit of claim 14, the power supply capacitor is charged by the auxiliary winding when a voltage of the auxiliary winding is higher than a maximum voltage of the power supply capacitor reached by being charged by the input voltage.

16. The power supply control circuit of claim 10, wherein the charging control circuit is integrated to the power control chip.

17. The power supply control circuit of claim 10, wherein the charging control circuit and the charging switch are integrated to the power control chip.

18. A control method of a power supply control circuit for controlling a charging process of a power supply capacitor to produce a power supply voltage to power a power control chip, the control method comprising:

charging the power supply capacitor based on a comparison result of the input voltage and a compensation signal;

wherein the compensation signal is generated based on a difference between a voltage reference and the power supply voltage, and is refreshed every time when the input voltage decreases to a voltage threshold.

19. The control method of claim 18, wherein charging the power supply capacitor based on the comparison result of the input voltage and the compensation signal comprises:

charging the power supply capacitor when the input voltage decreases to the compensation signal; and stopping charging the power supply capacitor when the input voltage increases to the compensation signal.

20. The control method of claim 19, wherein the control method further comprises:

charging the power supply capacitor by an auxiliary winding when a voltage of the auxiliary winding is higher than a maximum voltage of the power supply capacitor reached by being charged by the input voltage.

* * * * *